United States Patent [19]

Henrich et al.

[11] 4,432,955
[45] Feb. 21, 1984

[54] PROCESS FOR DESORBING FISSION IODINE FROM NITRIC ACID FUEL SOLUTION

[75] Inventors: Edmund Henrich, Dettenheim; Elmar Schlich, Linkenheim-Hochst., both of Fed. Rep. of Germany

[73] Assignees: Kernforschungszentrum Karlsruhe GmbH, Karlsruhe; Nukem GmbH, Hanau, both of Fed. Rep. of Germany

[21] Appl. No.: 218,193

[22] Filed: Dec. 19, 1980

[30] Foreign Application Priority Data

Dec. 20, 1979 [DE] Fed. Rep. of Germany ....... 2951339

[51] Int. Cl.³ .............................................. C01F 13/00
[52] U.S. Cl. ...................................... 423/249; 55/71; 252/630
[58] Field of Search ............................ 55/71; 252/630; 423/249; 376/310

[56] References Cited

U.S. PATENT DOCUMENTS

| | | | |
|---|---|---|---|
| 3,803,295 | 4/1974 | Cathers et al. | 423/249 |
| 3,914,388 | 10/1975 | Cathers et al. | 423/249 |
| 4,206,073 | 6/1980 | Hesky et al. | 423/249 |
| 4,275,045 | 6/1981 | Anav et al. | 252/630 |
| 4,277,256 | 7/1981 | Hesky et al. | 55/71 X |

*Primary Examiner*—Leland A. Sebastian
*Attorney, Agent, or Firm*—Spencer & Frank

[57] ABSTRACT

A process for desorbing fission iodine from a solution in a dissolver containing nitric acid and nuclear fuel. At least part of the solution is distilled by boiling creating an iodine-containing vapor, and the condensate vapor is conducted in an ascending condenser in countercurrent with its condensate. The resulting condensate is the returned to the dissolver. The desorption of the iodine in the condenser is effected by means of a gas.

11 Claims, 10 Drawing Figures

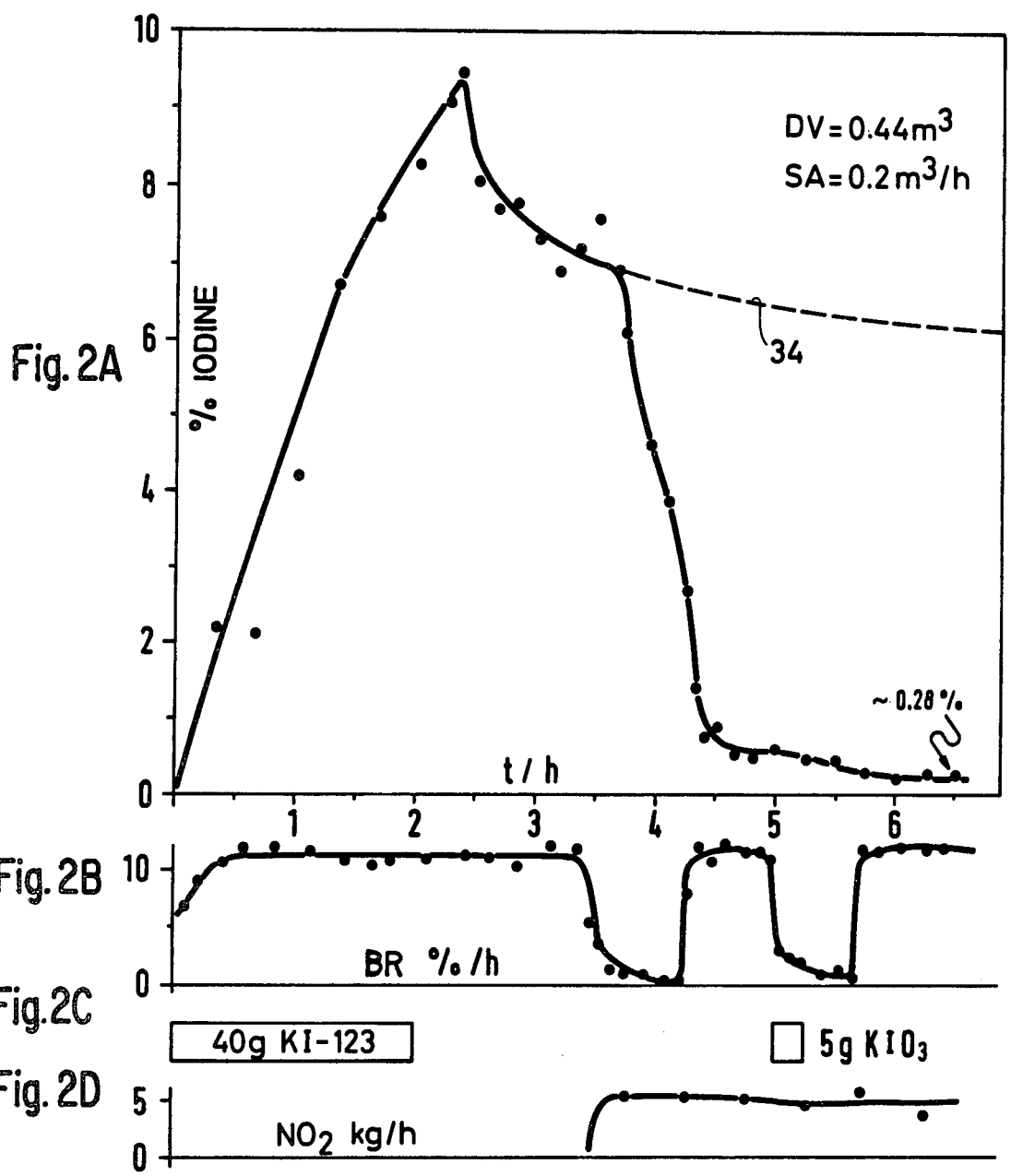

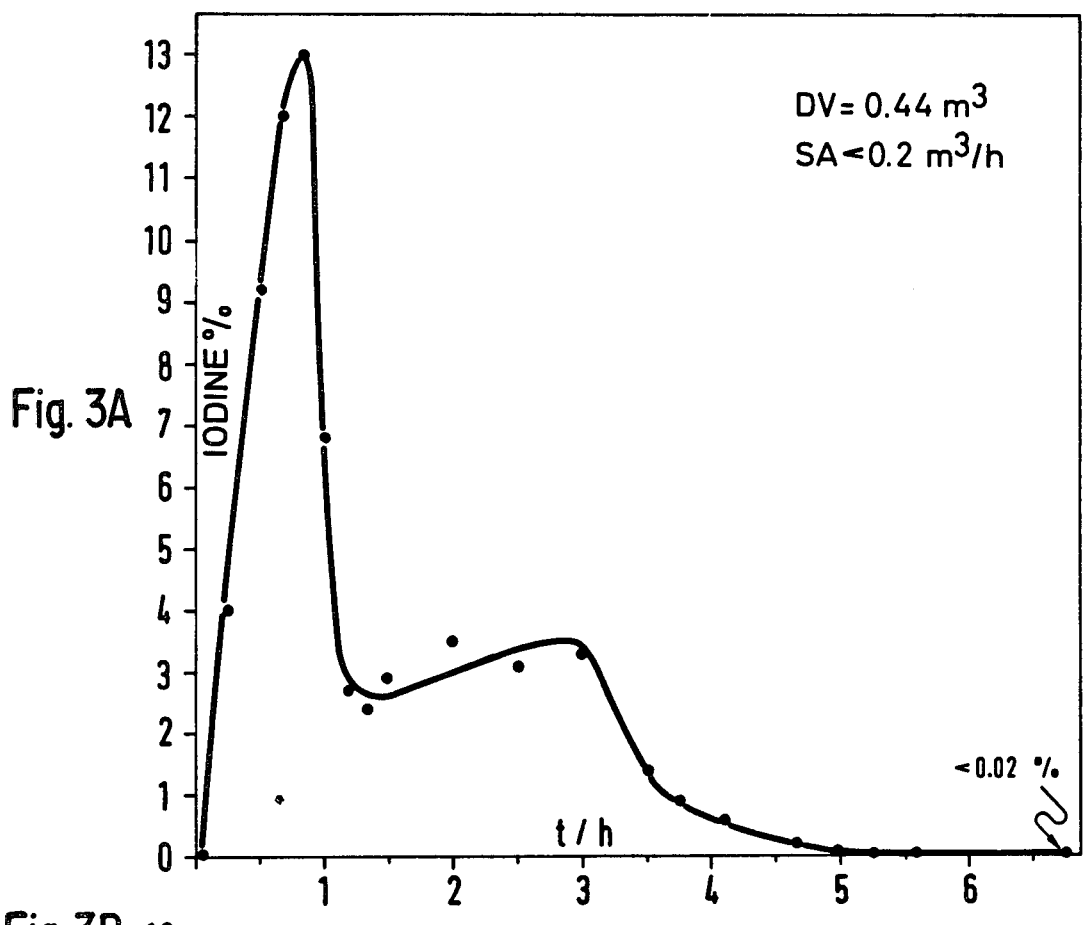
Fig. 3A
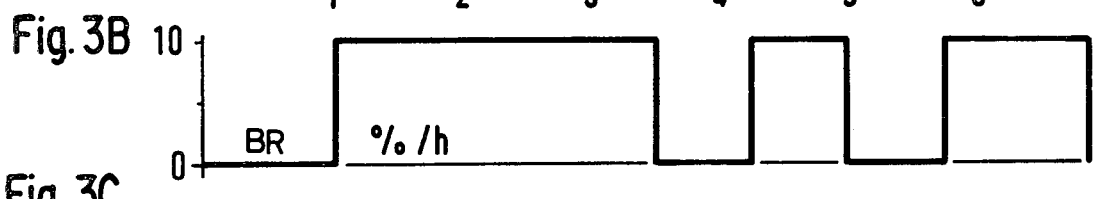
Fig. 3B
Fig. 3C
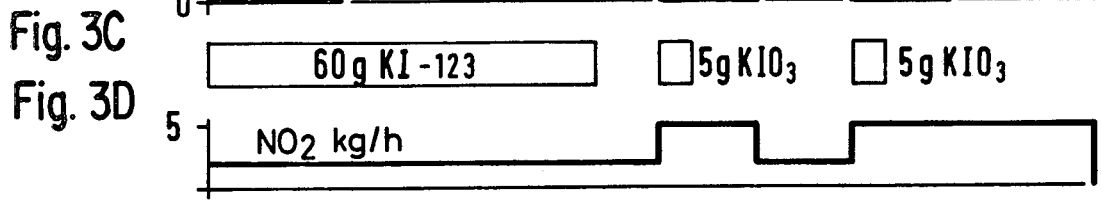
Fig. 3D

PROCESS FOR DESORBING FISSION IODINE FROM NITRIC ACID FUEL SOLUTION

BACKGROUND OF THE INVENTION

The present invention relates to a method for desorbing fission iodine from a solution containing nitric acid and nuclear fuel.

The retention of radioactive iodine and its compounds is a safety problem in nuclear plants. The radioactive iodine is a volatile fission product of nuclear reactor fuels and is retained in the fuel pellets from the light water reactor fuel elements. When reprocessing a fuel element, iodine[129] is of radiological significance, if cooling periods of greater than one year are involved since, due to its long half-life of $1.57 \times 10^7$ years, iodine[129] can accumulate in the biosphere.

Even when special measures are not taken, a large amount of the fission iodine will still be desorbed or separated into the dissolver off-gas during the dissolution of the nuclear fuel due to the evolution of water vapor-saturated nitric oxides, and possibly, stirring air. The residual non-distillable and hard to distill iodine remaining in the fuel solution is then distributed during subsequent processing operations among a plurality of different process streams and must, therefore, be removed from the vessel off-gas in the processing and waste treatment systems.

It is known to remove or drive the fission iodine from the fuel solution by distilling part of the nuclear fuel solution, thus producing a distillate, and/or by desorbing the fission product iodine from the heated fuel solution with the aid of larger amounts of stirring gas.

These prior art methods suffer from several disadvantages. For example, in order to assure release of the fission iodine from the fuel solution, except for the remainder of a few parts per thousand, up to approximately 50% of the fuel solution must be distilled and processed. Further, substantially greater gas throughputs are necessary in a downstream condenser (cocurrent flow of gas and condensate) with the direct return of the distillate into the dissolver. Finally, the resulting dilution of the contaminants contained in the dissolver off-gas requires considerably greater expenditures for equipment and filters.

SUMMARY OF THE INVENTION

It is therefore an object of the present invention to provide a highly efficient process for the release or separation of fission iodine from a nuclear fuel solution.

It is also an object of the present invention to simultaneously achieve a considerable reduction in the amount of distillate being produced and in the amount of transporting gases employed.

To achieve these and other objects and in accordance with its purpose, the present invention is directed to a process for desorbing fission iodine from a nuclear fuel solution containing nitric acid, in a dissolver. In this process, at least a part of the solution is distilled and the resulting distillate is returned to the dissolver, or the desorption of the iodine containing solution which is preferably heated, is effected by means of a gas. The process comprises the following steps:

The vapor produced during boiling of the solution is conducted in an ascending condenser (reflux condenser), in which a portion of the vapor is condensed, in countercurrent flow with the condensate. The condenser has parameters such that more than one theoretical stage is created in the condenser in which the distribution of iodine between the condensate and the vapor is in equilibrium.

The condensate is returned directly into the dissolver in order to maintain a sufficiently constant volume of the solution in the dissolver.

The iodine is removed from the condenser by passing through the condenser in ascending manner, a sufficient amount of transporting gas, which includes at least a portion of the vapor. The transporting gas comprises at least one gas selected from the group consisting of water vapor, nitrogen oxides NO and $NO_2$, air components, and small quantities of other noncondensable and/or non-reactive (to iodine) gas components. This transporting gas and the gaseous iodine are removed from the top of the condenser.

The temperature at which the transporting gas is removed from the condenser (condenser discharge temperature) is adjusted to between a temperature of at least 40° C. and a temperature below the boiling temperature of the liquid as determined by the operating pressure of the process.

The rate and duration of the boiling of the solution are adjusted during and after the dissolution of the nuclear fuel so that at least 20% of the solution is converted to vapor, in order to achieve effective iodine desorption.

At least in the course of one to several hours toward and after the end of the dissolution, nitrogen oxides selected from the group consisting of $NO_2$ and mixtures of NO and $NO_2$ are introduced into the solution in order to reduce hard to distill or non-distillable oxidized iodine species.

Toward the end of the desorption process, after the fission iodine content has dropped to several parts per thousand to several percent, inactive carrier iodine is added to the solution in an amount of about 5% to about 20% of the total fission iodine content in the dissolved nuclear fuel, in order to accelerate the desorption of the iodine and to improve the degree of desorption.

Several advantages are realized with the process of the present invention. The need for handling iodine-containing distillates is eliminated. Further, purification of the dissolver off-gas is significantly enhanced due to the significantly reduced gas quantities necessary for iodine transport. Finally, a constant liquid level is assured in the dissolver.

It is understood that both the foregoing general description and the following detailed description are exemplary, but are not restrictive of the invention.

BRIEF DESCRIPTION OF THE DRAWINGS

The accompanying drawings, in which like numbers indicate like parts, illustrate an example of a prior art process and an example of a presently preferred embodiment of the present invention and, together with the description, serve to explain the principles of the invention.

FIG. 2A shows one embodiment of the residual iodine content of a fuel solution, over a period of time, which is subjected to iodine desorption by means of distillation in accordance with the device of FIG. 1A.

FIG. 2B shows the corresponding boiling rate over a period of time for the embodiment of FIG. 2A.

FIG. 2C shows the addition of potassium iodide and potassium iodate over a period of time for the embodiment of FIG. 2A.

FIG. 2D shows the addition of nitrogen dioxide over a period of time for the embodiment of FIG. 2A.

FIG. 3A shows one embodiment of the residual iodine content of a fuel solution, over a period of time, which is subjected to iodine desorption by means of boiling under reflux in accordance with the present invention and performed in the apparatus of FIG. 1B.

FIG. 3B shows the corresponding boiling rate over a period of time for the embodiment illustrated in FIG. 3A.

FIG. 3C shows the addition of potassium iodate over a period of time for the embodiment illustrated in FIG. 3A.

FIG. 3D shows the addition of nitrogen dioxide over a period of time for the embodiment illustrated in FIG. 3A.

DETAILED DESCRIPTION OF THE INVENTION

Figure 1A:
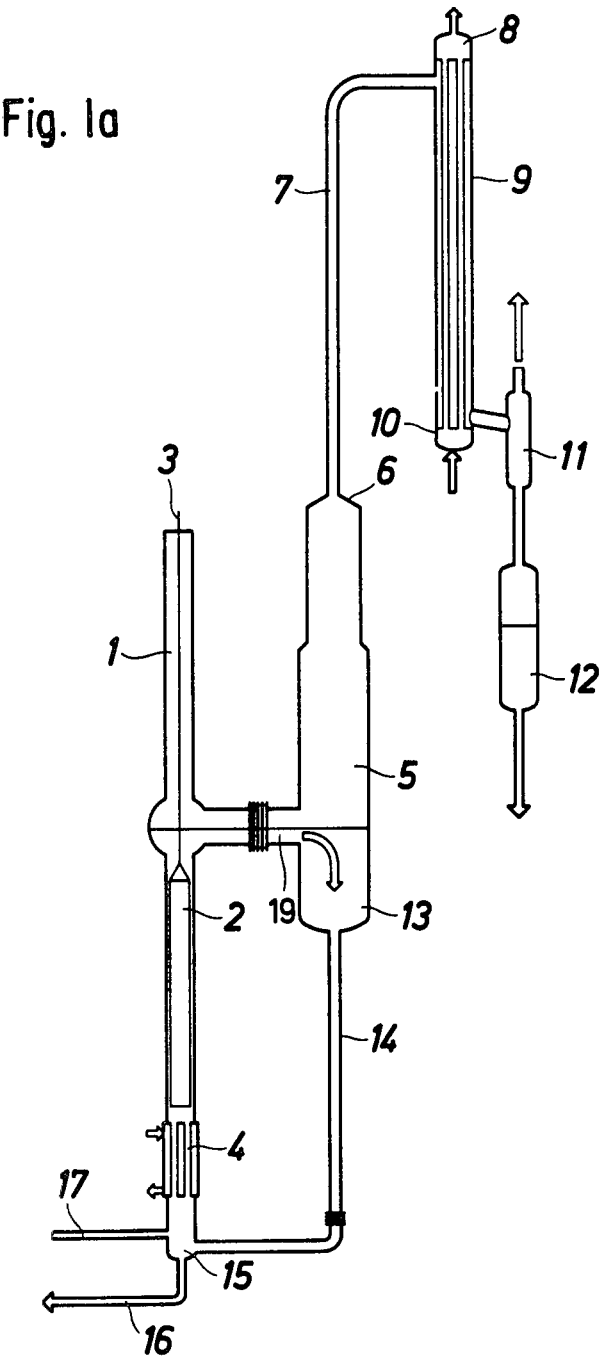
FIG. 1a is a schematic representation of a device for desorbing iodine from a nuclear fuel solution by means of the distillation of the nuclear fuel solution in accordance with the prior art.

The term fission iodine, as used in this specification, relates to the radioactive forms of iodine that are fission products of nuclear reactor fuels, e.g., uranium, thorium or plutonium. Examples of radioactive fission iodine are $I^{129}$ and $I^{131}$.

In the practice of the present invention, nuclear fuel containing fission iodine species is dissolved in a dissolver in nitric acid to form an aqueous solution containing nitric acid and nuclear fuel. At least part of this nuclear fuel solution is distilled by boiling to drive fission iodine from the solution and the resulting distillate is returned to the dissolver. During the course of dissolution of the fuel, iodine species react with the nitric acid to produce elemental iodine which is a component of the vapor produced by the boiling. Other components of the vapor include water vapor, nitric acid gas and nitrogen oxides, NO and $NO_2$. In addition to removing fission iodine by boiling, desorption of the fission iodine from the nuclear fuel solution is an alternative effected by passing a gas through the solution which preferably is heated.

In accordance with the present invention, the vapor produced by the boiling is conducted in a reflux or ascending condenser, in which a portion of the vapor is condensed, in countercurrent flow with the condensate. The vapor enters at the bottom of the condenser and travels upward toward the exit. In the condenser, a portion of the vapor condenses, and the iodine in the vapor is distributed between the vapor and the condensate. The condenser parameters should be selected such that more than one theoretical stage is created in the condenser in which the iodine distributed between the vapor and condensate is in equilibrium. The ascending or reflux condenser thus provides a multistage countercurrent contact of the vapor and condensate within the condenser. The selection of condenser parameters to accomplish this is within the ability of one of ordinary skill in the art. For example, for a shell and tube condenser, the number of theoretical stages depends, among other things, on the diameter and length of the tubes. The number of theoretical stages can vary over a wide range and can be, for example, 2, 5, 10 or 20.

In accordance with the present invention, a sufficiently constant volume of the solution is maintained in the dissolver by returning the condensate from the ascending condenser to the solution in the dissolver. This is accordingly known as boiling with return flow, or boiling under reflux. The condensate from the reflux condenser generally contains only a very small fraction of iodine and is returned directly to the solution in the dissolver.

In accordance with the present invention, the iodine in the condenser is removed by passing through the condenser in ascending manner, a sufficient amount of a transporting gas which includes a portion of the vapor. This transporting gas may, in some cases, consist entirely of a portion of the vapor produced by the boiling, including such gases as NO, $NO_2$, water vapor, nitric acid vapor, air components, and small amounts of other noncondensable (eg. $N_2, N_2O, CO_2$) and/or non-reactive (to iodine) gases.

It is also possible to add purging gases to the system which serve as transporting gases. These purging gases may include air, nitrogen, NO, $NO_2$ and mixtures of these. These gases may be added first in-to the solution in the dissolver or at a point such as in a vapor chamber which connects the dissolver to the reflux condenser.

The transporting gas serves to desorb the iodine from the condensed vapor (the condensate) in the condenser. When the transporting gas is added in-to the dissolver solution, it serves to desorb the iodine from the solution in the dissolver. After passing through the condenser, the transporting gas together with the gaseous iodine is then removed from the condenser at the top of the condenser.

In accordance with the invention, the temperature at which the transporting gas phase is removed from the condenser is generally adjusted to between a temperature of at least 40° C. and a temperature below the boiling temperature of the solution, as determined by the operating pressure of the process, and is preferably between 60° and 90° C. The higher the exit temperature, the smaller the amount of transporting gas that is required. The volume of transport gas transports all the fission iodine as iodine vapour; the minimum volume necessary can be calculated by the iodine vapour pressure and the amount of iodine present.

When the nuclear fuel utilized is uranium dioxide, the amount of noncondensable and non-reactive transporting gas in the condenser will, according to the present invention, preferably be less than the quantity of air necessary to oxidize the quadrivalent uranium of the dioxide fuel to hexavalent uranium, so as to completely oxidize the nitrogen oxides during recombination to nitric acid in the dissolver off-gas system.

In accordance with the present invention, the rate and duration of the boiling of the fuel solution during and after the dissolution of the nuclear fuel is adjusted so that at least 20% by volume of the solution is converted to vapor. This can be done, for instance, by adjusting the rate and duration of the boiling so that the product of the boiling rate in percent per hour and boiling duration in hours is greater than 20%.

With the boiling process so far described, hard-to-distill and non-distillable oxidized iodine species such as isodate will remain in the solution. In accordance with the present invention, in order to convert these hard-to-distill and non-distillable oxidized iodine species into a distillable form, nitrogen oxides selected from the group consisting of $NO_2$ and mixtures of NO and $NO_2$, are introduced into the fuel solution. This will be done at least in the course of between one and several hours, and preferably between one and three hours after the end of the dissolution of the fuel. Nitrogen oxides may be added continuously in varying amounts, throughout the entire process. In one embodiment of the present invention, the nitrogen oxides are added only after the boiling of the fuel solution has been interrupted. Preferably, the temperature of the solution in the dissolver will be somewhat below the boiling point during addition of the nitrogen oxides, such as 5° to 30° C. below the boiling point. The total amount of nitrogen oxides added can be about 1 mol $NO_2$ per mol U or 50 m³ $NO_2$ per one ton U.

When uran dioxide is the nuclear fuel, the amount of nitrogen oxides introduced into the dissolver is generally greater than 0.4 moles/ton uranium and less than 4 moles/ton uranium, and is preferably 1-2 moles/ton of uranium.

Similar $NO_x$ amounts are required per ton of heavy metal in breeder or other types of nuclear fuel.

The nitrogen oxides are introduced after end of dissolution when no more $NO_x$ is evolved in the dissolution reaction; the $NO_x$ addition overlaps slightly with the end of dissolution, where the $NO_x$ evolution has been decreased to low values.

In accordance with the present invention, after the fission iodine content has dropped to several tenth of a percent parts per thousand to several percent, preferably at about 1 percent, an inactive carrier iodine is added to the solution, in order to accelerate the desorption of the iodine and to improve the degree of desorption. The amount of carrier iodine added is preferably about 5% to about 20% by weight of the total fission iodine content in the dissolved nuclear fuel. The cartier iodine concentration will then be usually $10^{-5}$ to $10^{-4}$ mol/l.

The carrier is typically an iodate, for example, potassium iodate. The iodate may be added during an interruption in the nitrogen oxide introduction, and for a period of time sufficient to substantially homogeneously distribute the iodate in the fuel solution. Since the carrier iodate is reduced to volatile elementary iodine during $NO_x$ introduction, it may be removed before a sufficiently homogenous distribution is obtained.

The present invention will now be explained with reference to the drawing figures.

A prior art device used for desorbing (separating) fission iodine is shown in FIG. 1a. The device includes a dissolver 1 into which a basket 2 on a rope pulley 3 can be inserted. Basket 2 is filled with spent reactor fuel elements which have been comminuted mechanically, e.g., by means of cutters. Dissolver 1 contains, for example, nitric acid for dissolving the nuclear fuel. A heating device 4 heats the nitric acid to accelerate the dissolving process. Stirring air may also be introduced into the dissolver in order to make the process more intensive. The vapor phase produced in dissolver 1 is collected in a vapor chamber 5 located downstream of dissolver 1. The upper end 6 of vapor chamber 5 is connected, by means of a first pipeline 7, with the upper end 8 of a tubular condenser 9 in which the cooling water flows from the bottom to the top and the condensing vapor phase from the top to the bottom. Condenser 9 is known as a descending condenser. The lower end 10 of condenser 9 is connected, by means of a phase separator 11, with a reservoir 12 for receiving the condensate.

A circulating vessel 13 is connected at its upper end, to dissolver 1 via connection 19 and via a second pipeline 14, with the lower end 15 of the heating leg of dissolver 1 in order to return the hot nitric acid to the dissolver. The solution containing the uranium fuel is discharged through an outlet 16. Nitrogen oxides, $NO_2$ or $NO-NO_2$ mixtures, as well as stirring air are introduced into dissolver 1 through a third pipeline 17, likewise connected to lower end 15 of the heating leg of dissolver 1.

In the iodine distillation apparatus described, additional treatment of the iodine containing distillate in the reservoir 12 is required as well as suitable measures to maintain a constant level in dissolver 1. These disadvantages can be avoided if a distillate, which is substantially free of iodine, can be returned directly into dissolver 1.

If the discharge of reservoir 12 of the device shown in FIG. 1a is returned directly into the dissolver containing the nuclear fuel solution, the amount of purging gas to be introduced into descending condensor 9 must be considerably increased in order to remove the iodine. This can be accomplished, for example, by feeding large amounts of stirring air into the nuclear fuel solution and/or by feeding purging air into the off-gas phase between the fuel solution and the condenser.

The disadvantages accompanying an increase in the amount of gas introduced is avoided in accordance with the present invention by boiling the nuclear fuel solution, conducting the vapor produced during the boiling in an ascending (reflux) condenser in countercurrent flow with the condensate of the solution, and returning the condensate resulting therefrom which is substantially free of iodine, directly to the dissolver, a process known as boiling with return flow, or boiling under reflux. This is accomplished with the apparatus illustrated in FIG. 1b.

Figure 1B:
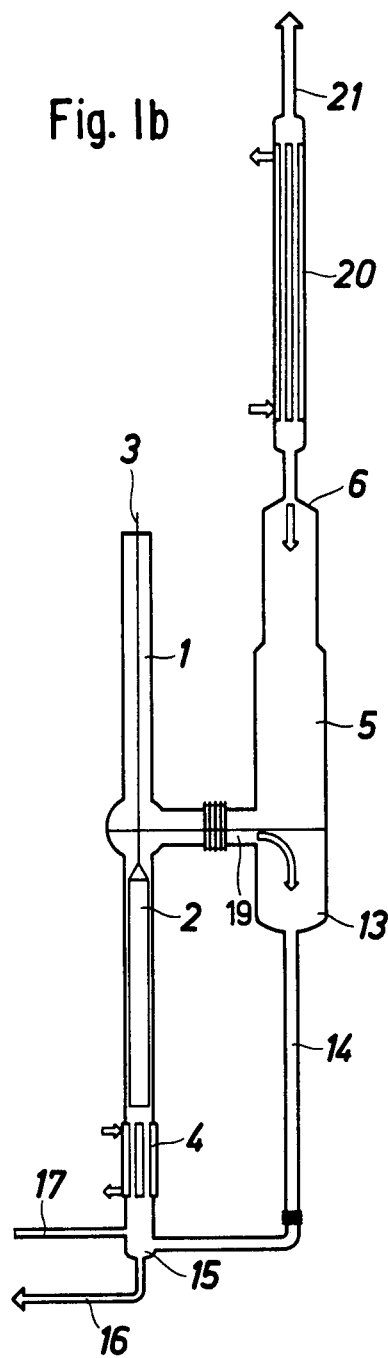
FIG. 1b is a schematic representation of a device for desorbing iodine from a nuclear fuel solution by means of boiling under reflux, in accordance with the present invention.

In FIG. 1b, the arrangement of dissolver 1 and the vapor chamber 5 is essentially the same as illustrated in FIG. 1a. However, the upper end 6 of vapor chamber 5 is connected to a reflux condenser 20 (ascending condenser) so that the condensate leaving the reflux condenser 20 goes directly through vapor chamber 5 into circulating vessel 13 and through second pipeline 14 to heating leg 15 of dissolver 1, resulting in the maintenance of a constant liquid level in dissolver 1.

The vapor entering the reflux condenser 20 contains a transporting gas which desorbs the iodine present in the returning condensate. The vapor contains only a small amount of transporting gas which assures movement of the iodine without condensation at the output 21 of reflux condenser 20. The higher the exit temperature of reflux condenser 20, the smaller is the amount of required transporting gas 20.

After removal of the basket containing the leached fuel element sleeves the iodine desorption or separation may continue with the solution present in the dissolver.

The sequence of an iodine desorption process by way of distillation with an arrangement accorrding to FIG. 1a is shown in FIGS. 2A to 2D as a function of time.

Diagram 2A shows the residual iodine content of the fuel solution over a period of time. In order to simulate release of fission iodine in the dissolution of the nuclear fuel, 40 g potassium iodide labelled with $I^{123}$ is added over 2 hours, according to diagram 2C and a boiling rate (BR) of about 12% per hour is established, as shown in diagram 2B. This causes the iodine content to rise, reach a value of 9.5% at the end of the iodine dissolution and, according to curve 34, would drop to a residual iodine content of about 6% after about 4 hours. This residual iodine essentially comprises an iodine species, such as iodate, that is no longer distillable. Starting at the end of the four hours, nitrogen dioxide is blown in at a rate of 5 kg per hour, as shown in diagram 2D. By blowing in the nitrogen dioxide this nondistillable iodine is reduced to a distillable form of iodine.

At the start of the addition of nitrogen dioxide, the addition of heat to the nuclear fuel solution is stopped. As a practical matter, this is done at this time because the rapid decomposition of the nitric acid formed during the absorption of $NO_2$ is to be avoided. Approximately 20 minutes after the start of the introduction of nitrogen dioxide, most of the nondistillable iodine is reduced to a distillable form of iodine so that the residual iodine content drops from 7% to 0.7% within approximately one hour. Despite an increase in the boiling rate and further introduction of nitrogen dioxide, the residual non-distillable iodine content initially decreases only slowly. The addition after about five hours of 5 kg of potassium iodate as an inactive carrier iodate, facilitates the removal of the residual iodine to about 0.3%. In the example illustrated in FIGS. 2A to 2D, the volume of the dissolver (DV) was 0.44 $m^3$ and 0.2 $m^3/h$ of stirring air (SA) were introduced into the dissolver.

The process sequence of iodine desorption by means of boiling with return flow, in accordance with the apparatus illustrated in FIG. 1b is shown in FIGS. 3A to 3D, as a function of time. Diagram 3A shows the curve representing the residual iodine content in the fuel solution over a period of time. In order to simulate the release of fission iodine during the dissolution of the nuclear fuel, a boiling rate (BR) of zero percent per hour is set as shown in diagram 3B, 60 grams of potassium iodate labelled with iodine$^{123}$ is introduced over a period of 3 hours, as shown in diagram 3C, and nitrogen dioxide is fed at the rate of about 2 kg per hour according to diagram 3D. The iodine content initially increases to 13%, and steeply drops to about 2.5% after about 1 hour, when the boiling rate (BR) increases to 10% per hour. The increase in the iodine content to about 3.5% occurring under constant process conditions, during the subsequent 2 hours, ends simultaneously with the introduction of potassium iodate according to diagram 3C.

By boiling the nuclear fuel solution for a total of about 3 hours and increasing the introduction of nitrogen dioxide toward the end of the process, as shown in diagram 3D, and providing two separate additions of 5 grams each of potassium iodate as the inactive carrrier iodate, the resulting residual iodine content is approximately an order of magnitude below the required 0.2%

The movement of iodine toward the reflux condenser is effected mainly by the nitrogen oxides which are absorbed only to an extent of about one-half, in the fuel solution and in the reflux condenser. The temperature at the condenser outlet 21 is on the average of 80° C. The simulated fuel solution contains about 10 mg/l of organic contaminents.

The volume of the dissolver (DV) in this case is 0.44 $m^3$, with less than 0.2 $m^3/h$ (0.05 up to about 0.1) of stirring air (SA) being introduced. (stirring air does not include the nitrogen oxides)

In both the examples in FIGS. 2A to 2D and FIGS. 3A to 3D, the simulated fuel solution consisted of 1 N uranyl nitrate $UO_2(NO_3)_2$ and 3-4 N nitric acid $(HNO_3)$.

It is understood that the above description of the present invention is susceptible to various modifications, changes and adaptions, and the same are intended to be comprehended within the meaning and range of equivalents of the appended claims.

What is claimed is:

1. In a process for desorbing fission iodine from a solution in a dissolver containing nitric acid and nuclear fuel, wherein at least a part of said solution is distilled by boiling and the resulting distillate is returned to the dissolver, the improvement comprising:
   (a) conducting the vapor produced during boiling of said solution in a reflux condenser, in which a portion of said vapor condenses to form a condensate, in countercurrent flow with the condensate, said condenser having parameters such that more than one theoretical stage is created in said condenser in which the distribution of iodine between the condensate and said vapor is in equilibrium;
   (b) returning said condensate directly into said dissolver in order to maintain a sufficiently constant volume of said solution in said dissolver;
   (c) removing said iodine from the condenser by passing through said condenser in ascending manner, a sufficient amount of a transporting gas, which includes at least a portion of said vapor, said transporting gas comprising at least one gas selected from the group consisting of water vapor, nitrogen oxides NO and $NO_2$, air components, and small quantities of at least one gas component selected from other noncondensable gas components and non-reactive to iodine gas components and removing the transporting gas and the gaseous iodine from the top of the condenser;
   (d) adjusting the temperature at which said transporting gas is removed from said condenser to between a temperature of at least about 40° C. and a temperature below the boiling temperature of said solution determined by the operating pressure of the process;
   (e) adjusting the rate and duration of the boiling of said solution during and after the dissolution of the nuclear fuel so that at least 20% by volume of said solution is converted to vapor in order to achieve the effective iodine desorption;
   (f) introducing into said solution nitrogen oxides selected from the group consisting of $NO_2$ and mixtures of NO and $NO_2$ at least in the course of one to several hours toward and after the end of the dissolution, in order to reduce hard to distill and nondistillable oxidized iodine species to a distillable form; and
   (g) adding to said solution toward the end of the desorption process, after the fission iodine content has dropped to several parts per thousand to several percent, inactive carrier iodine in an amount of about 5% to about 20% by weight of the total fission iodine content in the dissolved nuclear fuel, in order to accelerate the desorption of the iodine and to improve the degree of desorption.

2. Process as defined in claim 1, where the iodine desorption from the fuel solution is completed in a vessel outside the dissolver.

3. Process as defined in claim 1 additionally comprising adding a purging gas to the transporting gas, wherein the volume of noncondensable and nonreactive purging gas in said condenser is less than the volume of air required to oxidize the quadrivalent uranium of said uranium dioxide to hexavalent uranium.

4. Process as defined in claim 1, wherein the nuclear fuel is a uranium containing nuclear fuel, and the quantity of nitrogen oxides added to said solution to reduce the hard to distill or non-distillable iodine species is greater than 0.4 moles per tone of uranium, and less than 4 moles per ton of uranium.

5. Process as defined in claim 1, wherein the nuclear fuel is leached in the dissolver by the nitric acid, the leached nuclear fuel is removed from the dissolver, and iodine desorption is continued in the dissolver, after removal of the leached nuclear fuel.

6. Process as defined in claim 1, wherein said nitrogen oxides are introduced into the solution after interrupting the boiling of said nuclear fuel solution.

7. Process as defined in claim 6, wherein the introduction of nitrogen oxides takes place with the solution at a temperature below the boiling point of said solution.

8. Process as defined in claim 1, wherein the carrier iodine is an iodate.

9. Process as defined in claim 8, comprising introducing the carrier iodate into the solution after interrupting the nitrogen oxide introduction and over a period of time which is required to substantially homogeneously distribute the iodate.

10. Process as defined in claim 1, wherein the temperature of the transporting gas removed from the condenser is between 60° and 90° C.

11. Process as defined in claim 1, wherein the desorption of said solution additionally is effected by passing a gas through the solution.

* * * * *